United States Patent
Joko

(10) Patent No.: US 9,026,120 B2
(45) Date of Patent: May 5, 2015

(54) LARGE CELL BASE STATION AND COMMUNICATION CONTROL METHOD

(75) Inventor: Shingo Joko, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 275 days.

(21) Appl. No.: 13/504,880

(22) PCT Filed: Oct. 28, 2010

(86) PCT No.: PCT/JP2010/069128
§ 371 (c)(1),
(2), (4) Date: Apr. 27, 2012

(87) PCT Pub. No.: WO2011/052664
PCT Pub. Date: May 5, 2011

(65) Prior Publication Data
US 2012/0214498 A1    Aug. 23, 2012

(30) Foreign Application Priority Data

Oct. 29, 2009 (JP) ................................ 2009-249465

(51) Int. Cl.
*H04W 40/00* (2009.01)
*H04W 72/04* (2009.01)
*H04W 16/32* (2009.01)
*H04W 72/08* (2009.01)

(52) U.S. Cl.
CPC .......... *H04W 72/0426* (2013.01); *H04W 16/32* (2013.01); *H04W 72/082* (2013.01)

(58) Field of Classification Search
CPC ............ H04W 16/32; H04W 72/0426; H04W 72/0453; H04W 72/082; H04W 7/085
USPC ............................ 455/449, 450, 452.1, 452.2
See application file for complete search history.

(56) References Cited

U.S. PATENT DOCUMENTS

| 5,193,101 | A | * | 3/1993 | McDonald et al. | 375/130 |
| 5,551,057 | A | * | 8/1996 | Mitra | 455/522 |
| 6,018,663 | A | * | 1/2000 | Karlsson et al. | 455/450 |
| 6,201,972 | B1 | * | 3/2001 | Hamabe | 455/450 |

(Continued)

FOREIGN PATENT DOCUMENTS

KR    10-2009-0067114 A    6/2009

OTHER PUBLICATIONS

TSG-Ran Working Group 4 (Radio) meeting #52; NTT DOCOMO; "Downlink Interference Coordination Between eNodeB and Home eNodeB"; R4-093244; Shenzhen; Aug. 24-28, 2009.

(Continued)

*Primary Examiner* — Temica M Beamer
(74) *Attorney, Agent, or Firm* — Studebaker & Brackett PC

(57) ABSTRACT

Disclosed is a large cell base station (100) that, in cases in which the interference from small cell base stations (300) experienced by a radio terminal (200) connected to said large cell base station (100) is at or above a prescribed value, estimates a non-interference PF evaluation value for assessing whether or not the allocation of resource blocks to the radio terminal (200) is suitable when said interference is assumed to not be present. Additionally, the large cell base station (100) transmits band-use restriction information, which indicates use restrictions for the frequency bands corresponding to the resource blocks, to the small cell base stations (300) in cases in which the non-interference PF evaluation value is at or above a prescribed value.

7 Claims, 5 Drawing Sheets

(56) References Cited

U.S. PATENT DOCUMENTS

2009/0161619 A1    6/2009  Noma
2011/0014920 A1*   1/2011  Nylander et al. ............. 455/442

OTHER PUBLICATIONS

TSG-RAN WG1 LTE Ad hoc meeting; RITT Huawei CATT; "Combining Inter-cell-interference co-ordination/avoidance with cancellation in uplink and TP"; R1-060419; Helsinki, Finland; Jan. 23-25, 2006.
TSG-RAN WG1 LTE Ad hoc meeting; Panasonic; "System Implementation of Coordinated Symbol Repetition for Inter-cell Interference Mitigation for Downlink"; R1-060160; Helsinki, Finland; Jan. 23-25, 2006.
3GPP TSG-RAN WG1 #58; QUALCOMM Europe; "Heterogeneous deployment studies for LTE-Advanced"; R1-093140; Shenzhen, China; Aug. 24-28, 2009.
International Search Report; PCT/JP2010/069128; Dec. 14, 2010.
An Office Action issued by the Korean Patent Office on Aug. 29, 2013, which corresponds to Korean Patent Application No. 2012-7012074 and is related to U.S. Appl. No. 13/504,880; with Concise Explanation.

* cited by examiner

LARGE CELL BASE STATION AND COMMUNICATION CONTROL METHOD

TECHNICAL FIELD

The present invention relates to a large cell base station to which a radio terminal is connected, the large cell base station configured to form a large cell in which a small cell base station configured to form a small cell smaller than the large cell is installed, and to a communication control method in the large cell base station.

BACKGROUND ART

An LTE standardized by 3GPP that is a standard-setting organization for a mobile communication system is a next generation radio communication system that achieves communications with a higher speed and a larger capacity compared with currently operated 3rd and 3.5th generation radio communication systems. Technical specifications of the LTE have been determined with a 3GPP Release 8. Recently, a Release 9 that is a function improved version of the Release 8 and an LTE Advanced that is an upgraded version of the LTE have been studied.

In the LTE Release 9, standardization of detail functions and requirements of a small cell base station (Home eNodeB) are under development. The small cell base station is a small base station capable of being installed in a room and is configured to form a cell (referred to as small cell) which is a communication area having a radius of several to several tens of meters. The small cell base station is installed to disperse the traffic of a large cell base station (Macro eNodeB) configured to form a large cell which is a communication area having a radius of about several hundreds of meters and to cover a dead area in the large cell.

In such a radio communication system, interference may occur in radio communications of a radio terminal connected to the large cell base station due to radio communications of the small cell base station in the following case. Specifically, this occurs when a frequency band of a resource block that is a radio resource capable of being allocated to the radio terminal in the large cell base station partly or completely overlaps with a frequency band of a resource block that is a radio resource capable of being allocated to another radio terminal in the small cell base station. To avoid the interference, for example, Non-Patent Document 1 proposes a technique in which an interface is established between the large cell base station and the small cell base station, and a resource block to be allocated by the small cell base station is restricted by the large cell base station through transmitting a predetermined message to the small cell base station.

PRIOR ART DOCUMENTS

Non-Patent Documents

NON-PATENT DOCUMENT 1: R4-093244, "Downlink Interference Coordination Between eNodeB and Home eNodeB," NTT DOCOMO

SUMMARY OF THE INVENTION

However, when the large cell base station employs a so-called PF (Proportional Fair) scheme, there is a problem that a state in which the large cell base station cannot allocate a resource block due to low throughput in the radio terminal continues while the radio terminal connected to the large cell base station is receiving large interference from the small cell base station. Furthermore, even when the large cell base station restricts the use of the resource block by the small cell base station, the following may occur if the throughput in the radio terminal is lower than that in another radio terminal. Specifically, in the above case, the large cell base station allocates the resource block to the other radio terminal while restricting the use of the resource block by the small cell base station by the above-described technique. Thus, the use efficiency of the resource block in the small cell base station is degraded.

Thus, an objective of the present invention is to provide a large cell base station and a communication control method that can appropriately reduce interference of a small cell base station with a radio terminal connected to the large cell base station while preventing degradation of a use efficiency of a radio resource.

The present invention has the following features to solve the problems described above. A first feature of a radio communication system according to the present invention is summarized as follows. A large cell base station (large cell base station 100) to which a radio terminal (radio terminal 200) is connected, is configured to form a large cell (MC1) in which a small cell base station (small cell base stations 300$a$, 300$b$) configured to form a small cell (small cells FC1, FC2) smaller than the large cell is installed. The large cell base station comprises: an evaluation value estimation unit (evaluation value estimation unit 122) configured to estimate an evaluation value for determining whether allocating a radio resource to the radio terminal is appropriate assuming that the radio terminal receives no interference from the small cell base station; and a band use restriction information transmitter (band use restriction information transmitter 125) configured to transmit, to the small cell base station, band use restriction information for instructing use restriction of a frequency band corresponding to the radio resource when the evaluation value estimated by the evaluation value estimation unit is a value indicating that allocating the radio resource is appropriate.

Such a large cell base station estimates an evaluation value for determining whether allocating the radio resource to the radio terminal is appropriate assuming a case where the radio terminal connected thereto receives no interference from the small cell base station. When the evaluation value is a value indicating that allocating the radio resource is appropriate, the large cell base station transmits to the small cell base station, the band use restriction information instructing use restriction of a frequency band corresponding to the radio resource. Thus, when the interference from the small cell base station to the radio terminal is large and the communication quality can be expected to improve assuming the case without the interference, the radio resource can be allocated with a control performed so that the interference to the radio terminal is avoided. Accordingly, the interference from the small cell base station to the radio terminal connected to the large cell base station can be appropriately reduced while degradation of the use efficiency of the radio resource is prevented.

A second feature of the present invention is summarized as follows. The radio resource corresponding to the frequency band under the use restriction corresponding to the band use restriction information is allocated to the radio terminal.

A third feature of the present invention is summarized as follows. The evaluation value estimation unit calculates the evaluation value by dividing a fixed value which indicates a communication quality before the radio terminal receives the interference from the small cell base station or which is an average value of values indicating the communication quality within a first predetermined period by a variable that is an average value of values indicating the communication quality within a second predetermined period.

A fourth feature of the present invention is summarized as follows. A large cell base station (large cell base station 100) to which a radio terminal (radio terminal 200) is connected, the large cell base station supporting an LTE and being configured to form a large cell (MC1) in which a small cell base station (small cell base stations 300a, 300b) configured to form a small cell (small cells FC1, FC2) smaller than the large cell is installed, comprises: a band use restriction information transmitter (band use restriction information transmitter 125) configured to transmit, to the small cell base station, band use restriction information for instructing use restriction of a frequency band corresponding to a radio resource to be allocated to the radio terminal.

A fifth feature of the present invention is summarized as follows. The large cell base station further comprises: a band use restriction release information transmitter (band use restriction release information transmitter 127) configured to transmit, to the small cell base station, band use restriction release information for instructing release of the use restriction of the frequency band corresponding to the radio resource to be allocated to the radio terminal.

A sixth feature of the present invention is summarized as follows. A communication control method in a large cell base station to which a radio terminal is connected, the large cell base station configured to form a large cell in which a small cell base station configured to form a small cell smaller than the large cell is installed, comprises the steps of: estimating, at the large cell base station, an evaluation value for determining whether allocating a radio resource to the radio terminal is appropriate assuming that the radio terminal receives no interference from the small cell base station; and transmitting, from the large cell base station to the small cell base station, band use restriction information for instructing use restriction of a frequency band corresponding to the radio resource when the estimated evaluation value is a value indicating that allocating the radio resource is appropriate.

A seventh feature of the present invention is summarized as follows. A communication control method in a large cell base station to which a radio terminal is connected, the large cell base station supporting an LTE and being configured to form a large cell in which a small cell base station configured to form a small cell smaller than the large cell is installed, comprises the step of: transmitting, from the large cell base station to the small cell base station, band use restriction information for instructing use restriction of a frequency band corresponding to a radio resource to be allocated to the radio terminal.

An eighth feature of the present invention is summarized as follows. The communication control method further comprises: the step of transmitting, to the small cell base station, band use restriction release information for instructing release of the use restriction of the frequency band corresponding to the radio resource to be allocated to the radio terminal.

According to the present invention, the interference from the small cell base station to the radio terminal connected to the large cell base station can be appropriately reduced, while degradation of the use efficiency of the radio resource is prevented.

DESCRIPTION OF THE EMBODIMENTS

Next, an embodiment of the present invention will be described with reference to the drawings. Specifically, a description is given on (1) Configuration of Radio Communication System, (2) Operation of Radio Communication System, (3) Advantageous Effects, and (4) Other Embodiments. In the description of the drawings of the embodiment below, same or similar reference signs denote same or similar elements and portions.

Figure 1:
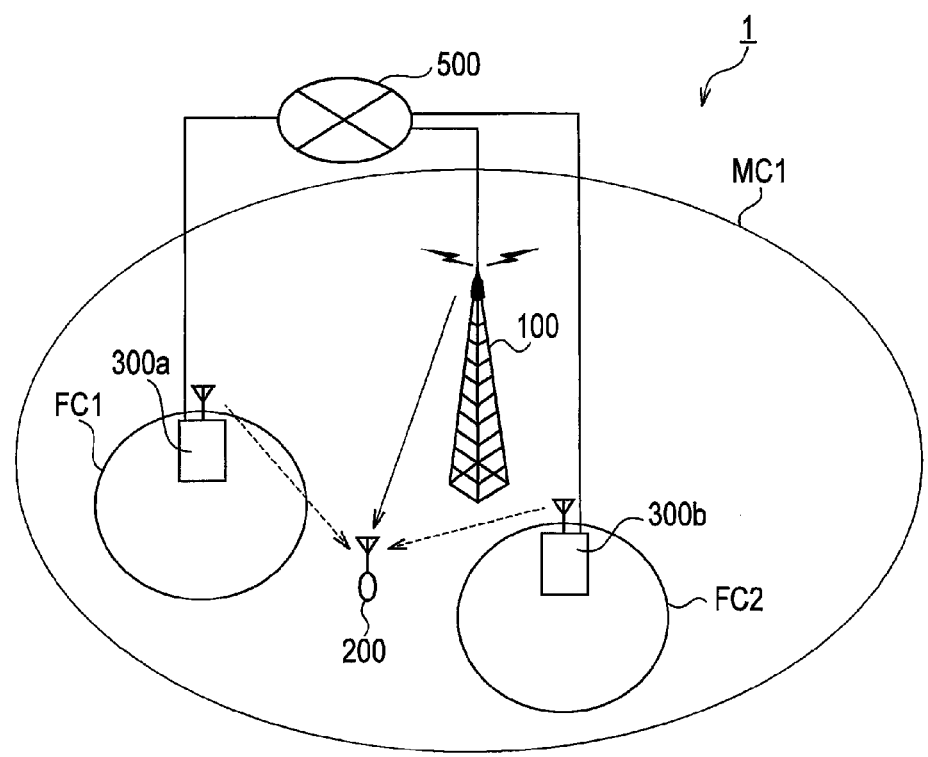
FIG. 1 is an overall schematic configuration view of a radio communication system according to an embodiment of the present invention.

(1) Configuration of Radio Communication System (1.1) Overall Schematic Configuration of Radio Communication System FIG. 1 is an overall schematic configuration view of a radio communication system 1 according to an embodiment of the present invention. The radio communication system 1 has a configuration based on an LTE Release 9 that is a 3.9th generation (3.9G) cell-phone system or an LTE-Advanced regarded as a 4th generation (4G) cell-phone system.

As shown in FIG. 1, the radio communication system 1 includes a large cell base station (e.g., macrocell base station) 100 configured to form a large cell (e.g., macrocell) MC1 as a radio wave range and small base stations (e.g., femtocell base station) 300a and 300b configured to form small cells (e.g., femtocell) FC1 and FC2 as radio wave ranges, respectively. The large cell MC1 has a radius of about several hundreds of meters for example, and the small cells FC1 and FC2 each have a radius of about several to several tens of meters for example. A radio terminal 200 is connected to the large cell base station 100.

In the description given below, when the small cells FC1 and FC2 are not distinguished from each other, the cells are simply referred to as "small cell FC". When the small cell base stations 300a and 300b are not distinguished from each other, the base stations are simply referred to as "small cell base station 300".

The large cell base station 100 is installed at a portion based on a station installation plan in which an inter-cell interference is taken into account by a communication carrier. In contrast, the small cell base station 300 has a small size to be suitably installed in a desired place (in a room, specifically) by a user. The small cell base station 300 is installed in the large cell MC1 to disperse the traffic of the large cell base station 100 and to cover a dead area in the large cell MC1.

The large cell base station 100 and the small cell base station 300 are connected to a network 500. The network 500 may be a LAN, the Internet, and the like. The network 500 may also be a dedicated network established between the large cell base station 100 and the small cell base station 300.

A downlink (link from the large cell base station 100 to the radio terminal 200, which will be hereinafter referred to as "large cell downlink") frequency band used in communications between the large cell base station 100 and the radio terminal 200 connected with each other may be the same with a downlink (link from the small cell base station 300 to an unillustrated radio terminal, which will be hereinafter referred to as "small cell downlink") frequency band used in communications between the small cell base station 300 and the unillustrated radio terminal connected with each other. In such a case, the radio terminal 200 communicating with the large cell base station is interfered by a radio signal transmitted to the unillustrated radio terminal from the small cell base station 300 through the downlink.

When the radio terminal 200 is interfered by the small cell base station 300 as described above, the large cell base station 100 controls downlink transmission power of the small cell base station 300 so that the interference is reduced.

(1.2) Configuration of Large Cell Base Station

Figure 2:
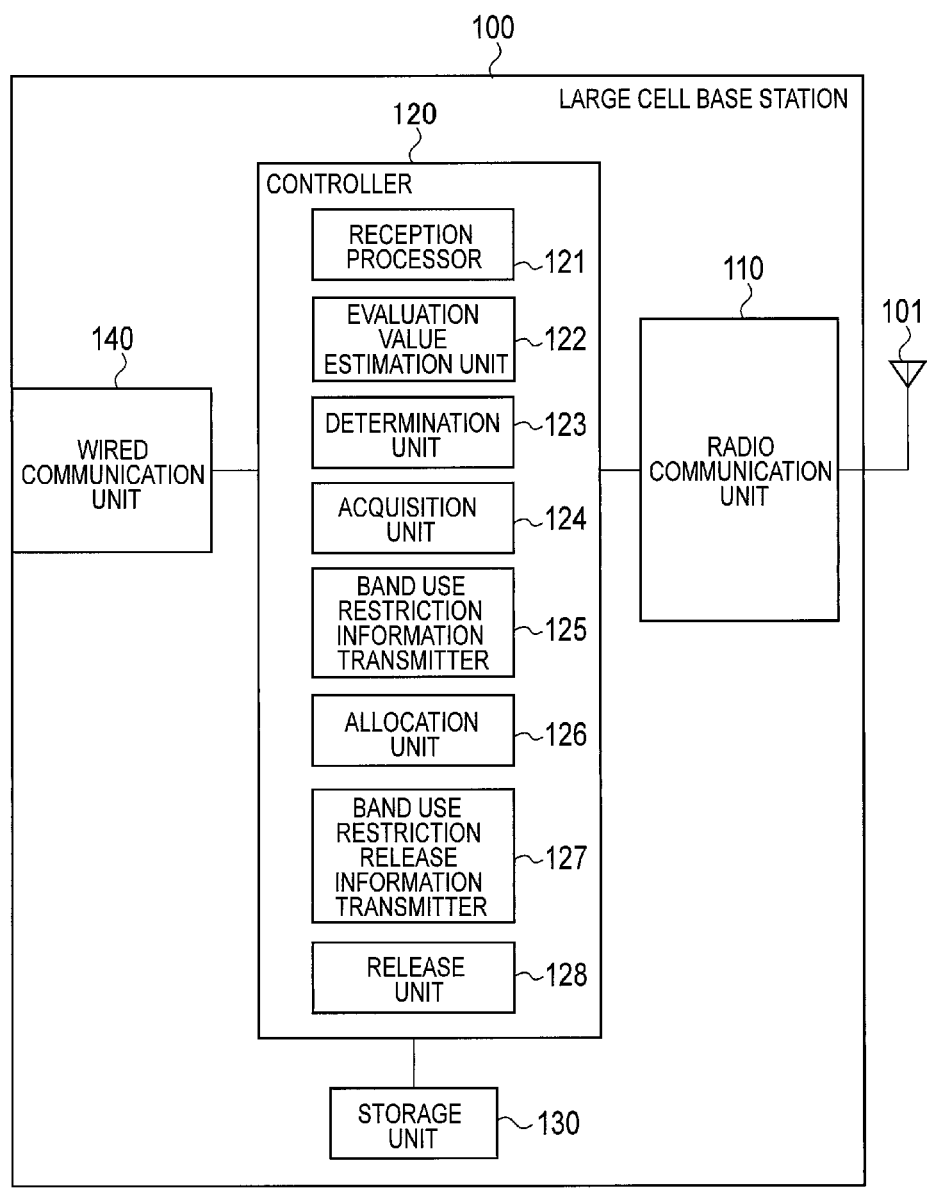
FIG. 2 is a block diagram showing a configuration of a large cell base station according to the embodiment of the present invention.

FIG. 2 is a block diagram showing a configuration of the large cell base station 100. As shown in FIG. 2, the large cell base station 100 employs a PF (Proportional Fair) scheme and includes an antenna unit 101, a radio communication unit 110, a controller 120, a storage unit 130, and a wired communication unit 140.

The radio communication unit 110 includes a radio frequency (RF) circuit, a baseband (BB) circuit, and the like, and transmits and receives a radio signal through the antenna unit 101. In addition, the radio communication unit encodes and modulates a transmission signal and demodulates and decodes a received signal.

The controller 120 is formed of a CPU for example and is configured to control various functions of the large cell base station 100. The storage unit 130 is formed of a memory for example and is configured to store therein various pieces of information used for the control of the large cell base station 100 and the like. The wired communication unit 140 is configured to communicate with an unillustrated other large cell, the small cell base station 300, and the like through the network 500.

The controller 120 includes a reception processor 121, an evaluation value estimation unit 122, an acquisition unit 124, a determination unit 123, a band use restriction information transmitter 125, an allocation unit 126, a band use restriction release information transmitter 127, and a release unit 128.

The reception processor 121 receives information indicating a communication quality in the radio terminal 200 from the radio terminal 200 through the antenna unit 101 and the radio communication unit 110. The information indicating the communication quality in the radio terminal 200 includes: a CQI (Channel Quality Indicator); a received electrical field intensity (hereinafter referred to as "RSRP (from small cell base station to large cell terminal)" of a reference signal from the small cell base station 300 in the radio terminal 200; a received electrical field intensity (hereinafter referred to as "RSRP (from large cell base station to large cell terminal)" of a reference signal from the large cell base station 100 to which the radio terminal 200 is connected in the radio terminal 200; and a received electrical field intensity (hereinafter referred to as "RSRP (from other large cell base station to large cell terminal)" of a reference signal from a large cell base station (herein after referred to as "other large cell base station") to which the radio terminal 200 is not connected, i.e., a large cell base station other than the large cell base station 100, in the radio terminal 200.

The RSRP (from small cell base station to large cell terminal) is also used as information indicating an amount of interference received by the radio terminal 200 from the small cell base station 300. The RSRP (from small cell base station to large cell terminal) is measured in the radio terminal 200 for each small cell base station 300 that has transmitted the reference signal and includes an ID as identification information of the corresponding small cell base station 300. The RSRP (from other large cell base station to large cell terminal) is measured in the radio terminal 200 for each of the other large cell base stations that have transmitted the reference signal.

Then, on the basis of the received CQI, the RSRP (from small cell base station to large cell terminal), the RSRP (from large cell base station to large cell terminal), and the RSRP (from other large cell base station to large cell terminal), the reception processor 121 determines whether the radio terminal 200 that has transmitted the information is receiving interference of a predetermined amount or larger from the small cell base station 300.

Specifically, the reception processor 121 calculates I (large cell terminal) that is an entire amount of interference received by the radio terminal 200. The following first to third methods are used for the calculation of I (large cell terminal).

In the first method, the reception processor 121 calculates the sum of the RSRP (from small cell base station to large cell terminal) and the RSRP (from other large cell base station to large cell terminal).

Then, the reception processor 121 adds a predetermined thermal noise power value to the sum of the RSRP (from small cell base station to large cell terminal) and the RSRP (from other large cell base station to large cell terminal). Thus, I (large cell terminal) is obtained. The thermal noise power value is stored in the storage unit 130. Alternatively, the thermal noise power value is transmitted from the radio terminal 200.

In the second method, the reception processor 121 calculates a SINR (Signal to Interference and Noise Ratio) corresponding to the large cell downlink in the radio terminal 200 on the basis of the CQI. Then, the reception processor 121 divides the RSRP (from large cell base station to large cell terminal) by the SINR. Thus, I (large cell terminal) is obtained.

In the third method, the reception processor 121 calculates the SINR (Signal to Interference and Noise Ratio) corresponding to the large cell downlink in the radio terminal 200 on the basis of the CQI.

In this process, the controller 120 measures a propagation loss (hereinafter referred to as "uplink propagation loss") in the uplink (link from the radio terminal 200 to the large cell base station 100 that is hereinafter referred to as "large cell uplink") used for communications between the large cell base station 100 and the radio terminal 200 connected to each other. The uplink propagation loss includes a distance attenuation, a shadowing loss, and a feature passing loss.

The reception processor 121 estimates a propagation loss (hereinafter referred to as "downlink propagation loss") PL in the large cell downlink from the uplink propagation loss. For example, the reception processor 121 regards the uplink propagation loss as a downlink propagation loss. Alternatively, the reception processor 121 regards a value obtained by adding a predetermined correction value to the uplink propagation loss as the downlink propagation loss.

Then, the reception processor 121 acquires a transmission power density (hereinafter referred to as "downlink transmission power density") P of the large cell downlink in the large cell base station 100. For example, the downlink transmission power density P is stored in the storage unit 130. The reception processor 121 divides the downlink transmission power density P by the downlink propagation loss PL and further divides the resultant value by the SINR. Thus, I (large cell terminal) is obtained.

After I (large cell terminal) is obtained through any one of the first to the third methods, the reception processor 121 divides the RSRP (from small cell base station to large cell terminal) by I (large cell terminal) to calculate a ratio (hereinafter referred to as "small cell base station interference amount ratio") of the amount of the interference received by the radio terminal 200 from the small base station 300 corresponding to the RSRP (from small cell base station to large cell terminal) to the entire amount of interference received by the radio terminal 200. When the reception processor 121 has received a plurality of RSRPs (from small cell base station to large cell terminal), that is, when the radio terminal 200 is receiving the interference from a plurality of small cell base stations 300, the reception processor 121 divides the RSRP (from small cell base station to large cell terminal) by I (large cell terminal) for each of the RSRPs (from small cell base station to large cell terminal) corresponding to the respective small cell base stations 300. Thus, the reception processor 121 calculates the small cell base station interference amount ratio for each small cell base station 300.

Furthermore, the reception processor 121 determines whether the calculated small cell base station interference amount ratio is equal to or larger than a threshold value α. The threshold value α is a real number (e.g., 0.9) between 0 and 1. The threshold value α is predetermined and is stored in the storage unit 130.

If the small cell base station interference amount ratio is equal to or larger than the threshold value α, the radio terminal 200 is largely affected by the interference from the small cell base station 300. In such a case, the controller 120 ceases resource block allocation based on the PF scheme and performs a control so that the small cell based station 300 does not allocate to another radio terminal connected to the small cell base station 300, a resource block having a frequency band partly or completely overlapping with a frequency band of a resource block to be allocated to the radio terminal 200.

When the small cell base station interference amount ratio is equal to or larger than the threshold value α, the evaluation value estimation unit 122 estimates an estimation value (hereinafter, referred to as "non-interfered PF evaluation value") for determining whether allocating a resource block to the radio terminal 200 is appropriate assuming a case where the radio terminal 200 receives no interference from the small cell base station 300.

Specifically, the evaluation value estimation unit 122 periodically acquires a throughput as a communication quality in radio communications between the radio terminal 200 and the large cell base station 100. Here, the throughput is a downlink throughput for example. The radio terminal 200 measures the downlink throughput and transmits the downlink throughput to the large cell base station 100.

Then, the evaluation value estimation unit 122 acquires a momentary throughput that is a fixed value. Here, the evaluation value estimation unit 122 acquires as the momentary throughput, a throughput before the radio terminal 200 receives the interference from the small cell base station 300. When the radio terminal 200 receives the interference from the small cell base station 300, the throughput is reduced than before the interference is received. Therefore, when a change of the periodically acquired throughput from a large value to a small value is detected, the evaluation value estimation unit 122 acquires the large value before the change as the throughput before the radio terminal 200 receives the interference from the small cell base station 300, i.e., the momentary throughput. Alternatively, the evaluation value estimation unit 122 calculates an average value of the throughputs within a past first predetermined period and acquires the average value as the momentary throughput.

Next, the evaluation value estimation unit 122 acquires an average throughput that is a variable. Here, the evaluation value estimation unit 122 calculates an average value of the throughputs within a second predetermined period going from the present back to the past, and acquires the average value as the average throughput. The second predetermined period is shorter than the first predetermined period.

Then, the evaluation value estimation unit 122 calculates the non-interfered PF evaluation value by dividing the momentary throughput by the average throughput. A larger non-interfered PF evaluation value indicates a higher appropriateness of the allocation of the resource block to the radio terminal 200.

The determination unit 123 determines a resource block to be newly allocated to the radio terminal 200 largely affected by the interference from the small cell base station 300.

The acquisition unit 124 acquires a transmission delay time of a signal from the large cell base station 100 to the small cell base station 300 as a source of the interference received by the radio terminal 200. When there are a plurality of small cell base stations 300 as the sources of the interference received by the radio terminal 200, the transmission delay time is acquired for each of the small cell base stations 300.

For example, the transmission delay time, e.g., 20 microseconds, is predetermined and is a time, which is estimated from past statistics or the like, by which a signal reaches the small cell base station 300 at the latest. Here, the transmission delay time is stored in the storage unit 130 and the acquisition unit 124 reads out the transmission delay time stored in the storage unit 130.

Alternatively, the transmission delay time is a transmission delay time measured when a network is established in the radio communication system 1. For example, in the LTE, when establishing an X2 connection, the large cell base station 100 transmits "X2 SETUP REQUEST" message, and "X2 SETUP RESPONSE" message as a response to the message is transmitted from the small cell base station 300. Here, ½ of the time between the transmission of the "X2 SETUP REQUEST" message to the transmission of the "X2 SETUP RESPONSE" message is measured as the transmission delay time and stored in the storage unit 130. The acquisition unit 124 reads out the transmission delay time stored in the storage unit 130.

Alternatively, the large cell base station 100 periodically transmits a predetermined signal (e.g., ping when the network 500 is a network employing TCP/IP such as a LAN, the Internet, and the like) to the small cell base station 300 and receives a response signal from the small cell base station 300. The acquisition unit 124 acquires ½ of the time between the transmission of the last signal and the reception of the response signal. The acquired time is the transmission delay time. Moreover, the acquisition unit 124 acquires the change of the transmission delay time on the basis of the reception interval of a message such as an OI (Overload Indicator) periodically transmitted from the small cell base station 300 and corrects the transmission delay time in accordance with the change. Specifically, the transmission delay time is corrected to be longer with a longer message reception interval.

Alternatively, the acquisition unit 124 acquires the transmission delay time on the basis of the change of the CQI transmitted from the radio terminal 200 in a case where the use of the frequency band in the small cell base station 300 is restricted. Specifically, when a use restriction is imposed on the frequency band in the small cell base station 300, the CQI improves. In such a case, the acquisition unit 124 acquires a time between the transmission of band use restriction information described later by the large cell base station 100 and the improving of the CQI. The acquired time is the transmission delay time. Here, the acquired transmission delay time is stored in the storage unit 130 and is used for releasing the use restriction of the frequency band in the small cell base station 300 and for restricting the use of the frequency band thereafter.

When the non-interfered PF evaluation value is equal to or larger than a predetermined value, the band use restriction information transmitter 126 generates band use restriction information instructing use restriction of a frequency band corresponding to the resource block determined by the determination unit 123. The band use restriction information includes information on the frequency band of which the use is to be restricted. Here, the predetermined value is a lowest value of the non-interfered PF estimation value indicating that allocating the resource block to the radio terminal 200 is appropriate, and is stored in the storage unit 130.

Furthermore, the band use restriction information transmitter 125 transmits to the small cell base station 300, the RNTP message including the generated band use restriction information through the wired communication unit 140 and the network 500. Here, the destination is one or a plurality of small cell base stations 300 corresponding to the RSRP (from small cell base station to large cell terminal) used for calculating the small cell base station interference amount ratio that is equal to or larger than the threshold value α among the small cell base station interference amount ratios.

When receiving the RNTP message including the band use restriction information, the small cell base station 300 restricts the allocation of the resource block corresponding to the frequency band included in the band use restriction information to the other radio terminals. If the resource block corresponding to the frequency band included in the band use restriction information has already been allocated, the small cell base station 300 releases the resource block.

The allocation unit 126 determines whether a time corresponding to the transmission delay time has elapsed after the transmission of the RNTP message including the band use restriction information by the band use restriction information transmitter 125. When the band use restriction information transmitter 125 has transmitted the RNTP message including the band use restriction information to a plurality of small cell base stations 300, the allocation unit 126 determines whether the time corresponding to the longest transmission delay time among the transmission delay times respectively corresponding to the small cell base stations 300 as the destinations has elapsed.

After the time corresponding to the transmission delay time has elapsed after the transmission of the RNTP message including the band use restriction information by the band use restriction information transmitter 125, the allocation unit 126 allocates the resource block determined by the determination unit 123 to the radio terminal 200 largely affected by the interference from the small cell base station 300. The allocation unit 125 may perform the following operation in consideration of a processing time for restricting the allocation of the resource block corresponding to the frequency band included in the band use restriction information to the other radio terminal after the reception of the RNTP message including the band use restriction information by the small cell base station 300. Specifically, the allocation unit 126 may allocate the resource block determined by the determination unit 123 to the radio terminal 200 largely affected by the interference from the small cell base station 300 after a time corresponding to a time obtained by adding the processing time for the allocation restriction in the small cell base station 300 to the transmission delay time after the transmission of the RNTP message including the band use restriction information. In such a case, the processing time for the allocation restriction in the small cell base station 300 is predetermined and stored in the storage unit 130.

The band use restriction release information transmitter 127 determines whether a resource block release timing has arrived that is a predetermined timing after the allocation unit 126 has allocated the resource block to the radio terminal 200. The resource block release timing is a timing arriving when a predetermined time elapses after the allocation unit 126 has allocated the resource block to the radio terminal 200 for example.

When the resource block release timing has arrived, the band use restriction release information transmitter 127 generates the band use restriction release information instructing the release of the usage limitation of the frequency band corresponding to the resource block determined by the determination portion 123. The band use restriction release information includes information on the frequency band of which the use restriction is to be released.

Furthermore, the band use restriction release information transmitter 127 transmits the RNTP message including the generated band use restriction release information to the small cell base station 300 through the wired communication unit 140 and the network 500. Here, the destination is the same small cell base station 300 as the destination of the RNTP message including the band use restriction information transmitted by the band use restriction information transmitter 125.

The release unit 128 releases the resource block allocated to the radio terminal 200 by the allocation unit 126 before the time corresponding to the transmission delay time elapses after the transmission of the RNTP message including the band use restriction release information by the band use restriction release information transmitter 127. Here, if the band use restriction release information transmitter 127 has transmitted the RNTP message including the band use restriction release information to a plurality of small cell base stations 300, the release unit 128 performs the following operation. Specifically, the release unit 128 releases the resource block allocated to the radio terminal 200 by the allocation unit 126 before the time corresponding to the shortest transmission delay time among the transmission delay times respectively corresponding to the small cell base stations 300 as the destinations elapses. Then, the control unit 120 resumes the resource block allocation based on the PF scheme.

When receiving the RNTP message including the band use restriction release information, the small cell base station 300 releases the allocation restriction of the resource block corresponding to the frequency band included in the band use restriction release information.

(2) Operation of Radio Communication System

Next, the operation of the radio communication system 1 will be described.

Figure 3:
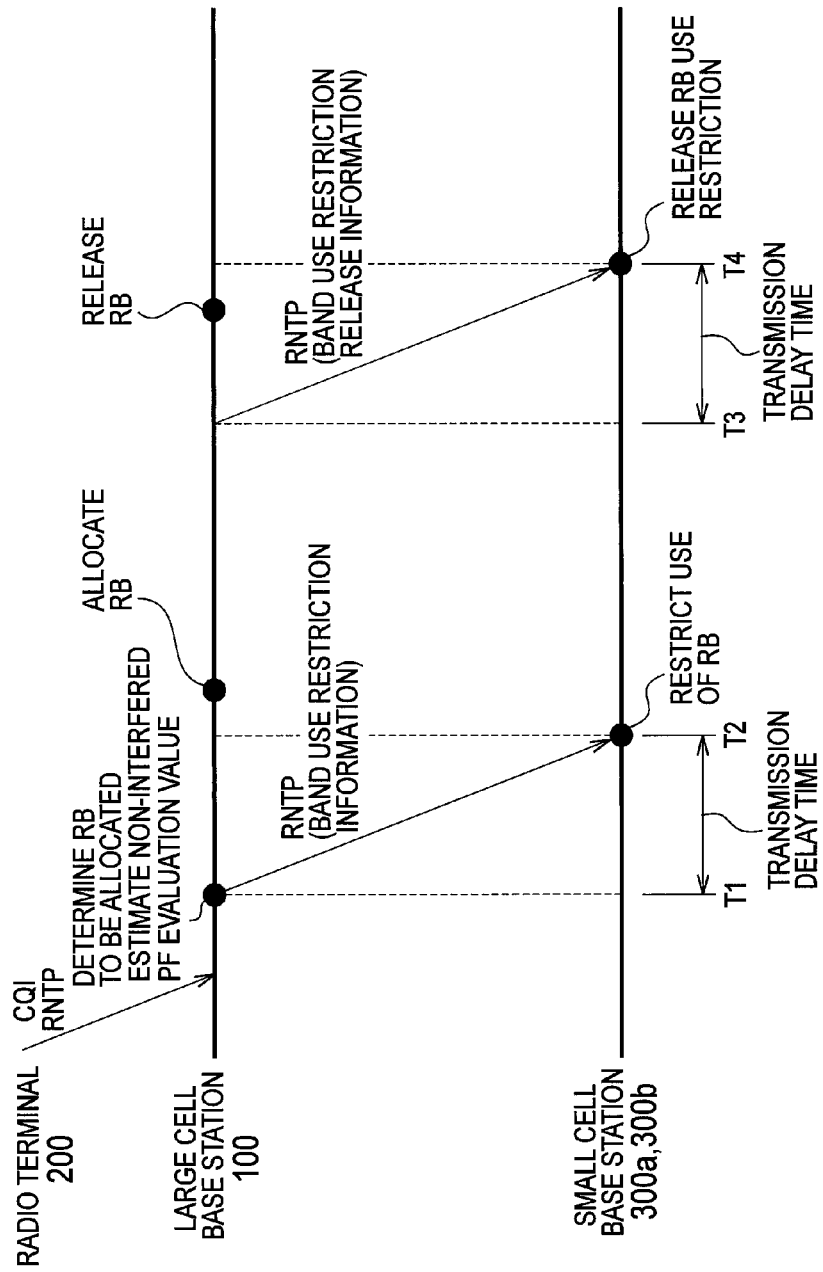
FIG. 3 is a time chart showing an operation of the radio communication system according to the embodiment of the present invention.

FIG. 3 is a time chart showing the operation of the radio communication system 1. As shown in FIG. 3, the large cell base station 100 receives from the radio terminal connected to the large cell base station 100, the CQI, the RSRP (from small cell base station to large cell terminal), the RSRP (from large cell base station to large cell terminal), and the RSRP (from other large cell base station to large cell terminal).

Then, the large cell base station 100 estimates the non-interfered PF evaluation value, determines the resource block to be allocated to the radio terminal 200, and transmits the RNTP message including the band use restriction information to the small cell base station 300.

The small cell base station 300 receives the RNTP message including the band use restriction information after the time corresponding to the transmission delay time (T2−T1) has elapsed after the large cell base station 100 has transmitted the RNTP message including the band use restriction information to the small cell base station 300. Then, the small cell base station 300 restricts the use of a predetermined resource block in accordance with the band use restriction information.

Meanwhile, the large cell base station 100 allocates the determined resource block to the radio terminal 200 after the time corresponding to the transmission delay time (T2−T1) has elapsed after the RNTP message including the band use restriction information is transmitted.

Then, when the resource block release timing arrives, the large cell base station 100 transmits the RNTP message including the band use restriction release information to the small cell base station 300. Furthermore, the large cell base station 100 releases the resource block allocated to the radio terminal 200 before the time corresponding to the transmission delay time (T4−T3) elapses after the RNTP message including the band use restriction release information is transmitted to the small cell base station 300.

Meanwhile, the small cell base station 300 receives the RNTP message including the band use restriction release information when the time corresponding to the transmission delay time (T4−T3) has elapsed after the large cell base station 100 has transmitted the RNTP message including the band use restriction release information. Thereafter, the small cell base station 300 releases the use restriction of the resource block of which the use has been restricted in accordance with the band use restriction release information.

Next, operations of the large cell base station 100 will be described.

Figure 4:
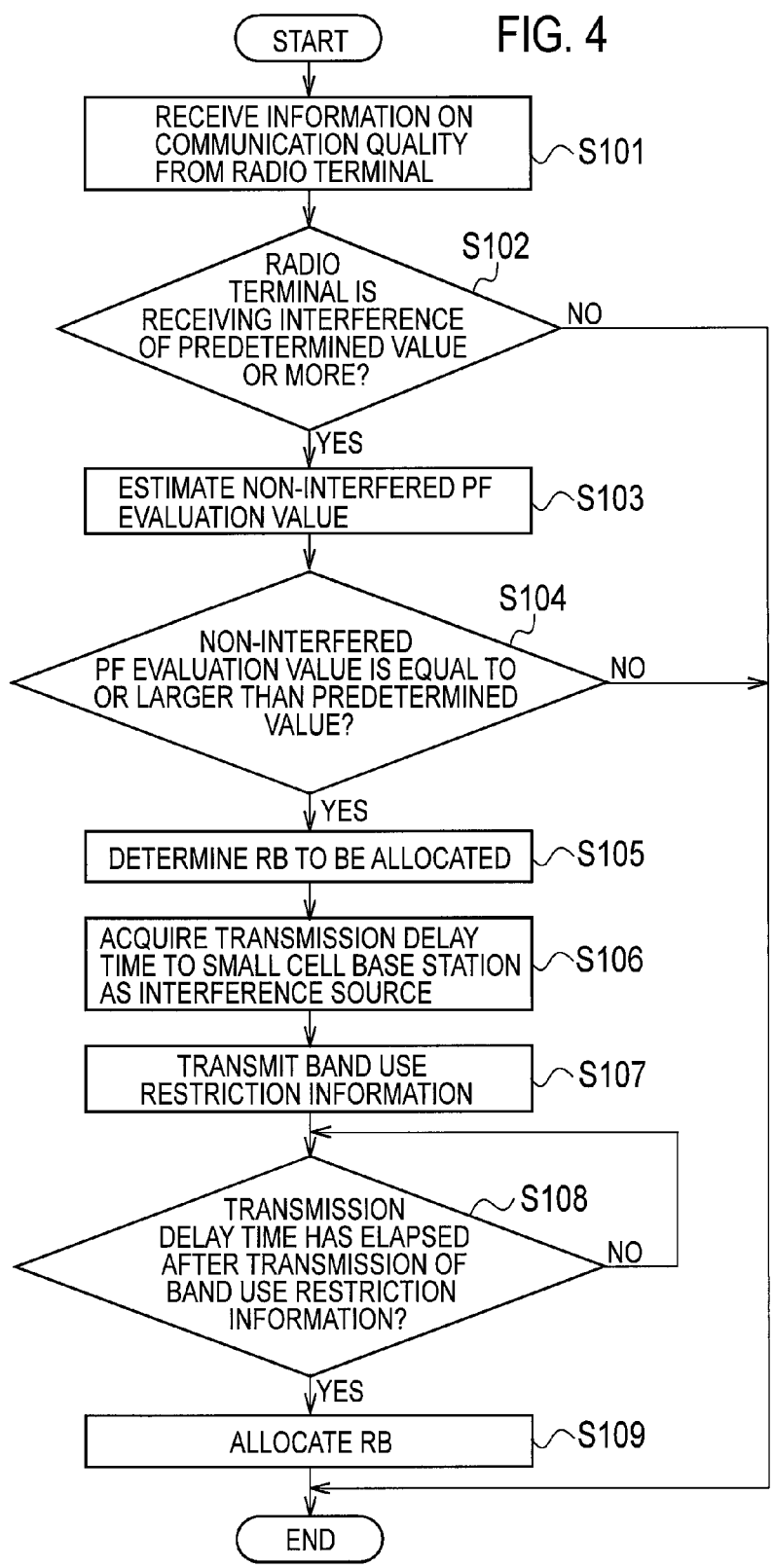
FIG. 4 is a flowchart showing a first operation of the large cell base station according to the embodiment of the present invention.

FIG. 4 is a flowchart showing a first operation of the large cell base station 100. In Step S101, the controller 120 of the large cell base station 100 receives the CQI, the RSRP (from small cell base station to large cell terminal), the RSRP (from large cell base station to large cell terminal), and the RSRP (from other large cell base station to large cell terminal) which are information indicating the communication quality in the radio terminal 200.

In Step S102, the controller 120 determines whether the radio terminal 200 is receiving the interference of a predetermined value or larger from the small cell base station 300. Specifically, the controller 120 determines whether the ratio of the amount of interference received by the radio terminal 200 from the small cell base station 300 corresponding to the RSRP (from small cell base station to large cell terminal) to the entire amount of the interference received by the radio terminal 200 is equal to or larger than the threshold value α.

When the radio terminal 200 is receiving the interference of the value equal to or larger than the predetermined value from the small cell base station 300, the series of operations is terminated. When the radio terminal 200 is receiving the interference of the amount equal to or larger than the predetermined value from the small cell base station 300, in Step S103, the controller 120 estimates the non-interfered PF evaluation value.

In Step S104, the controller 120 determines whether the estimated non-interfered PF evaluation value is equal to or larger than the predetermined value. When the non-interfered PF evaluation value is smaller than the predetermined value, the series of processes is terminated. On the other hand, when the non-interfered PF evaluation value is equal to or larger than the predetermined value, in Step S105, the controller 120 determines the resource block to be newly allocated to the radio terminal 200.

In Step S106, the controller 120 acquires the transmission delay time of the signal transmitted to the small cell base station 300 as the source of the interference received by the radio terminal 200.

In Step S107, the controller 120 generates the band use restriction information instructing the use restriction of the frequency band corresponding to the resource block determined in Step S105. Then, the controller 120 transmits the RNTP message including the generated band use restriction information to the small cell base station 300.

In Step S108, the controller 120 determines whether the time corresponding to the transmission delay time has elapsed after the controller 120 has transmitted the RNTP message including the band use restriction information. When the time corresponding to the transmission delay time elapses after the RNTP message including the band use restriction information is transmitted, in Step S109, the controller 120 allocates the resource block determined in Step S105 to the radio terminal 200.

Figure 5:
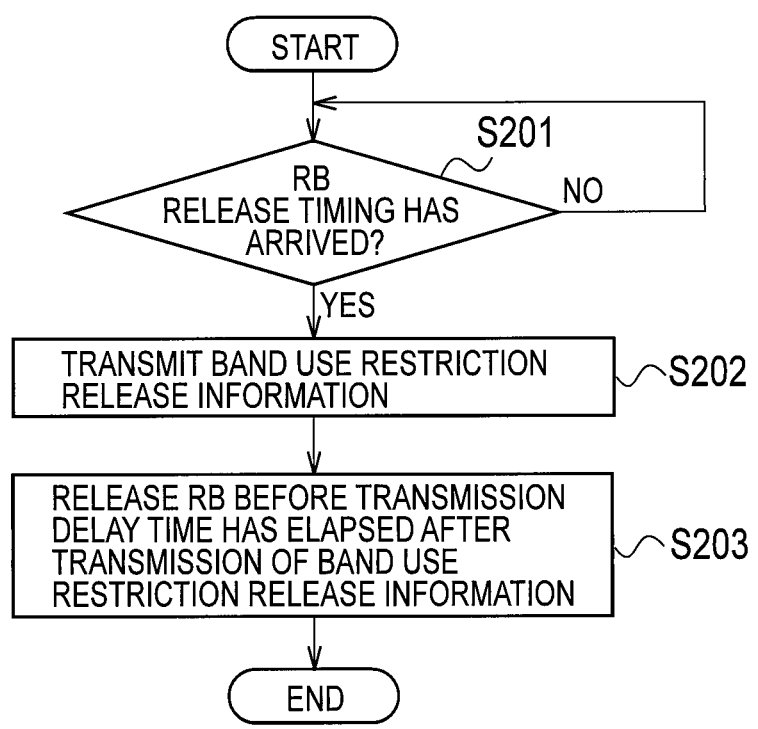
FIG. 5 is a flowchart showing a second operation of the large cell base station according to the embodiment of the present invention.

FIG. 5 is a flowchart of a second operation of the large cell base station 100.

In Step S201, the controller 120 in the large cell base station 100 determines whether the resource block release timing has arrived. When the resource block release timing has arrived, in Step S202, the controller 120 generates the band use restriction release information instructing the release of the use restriction of the frequency band corresponding to the resource block determined in Step S104 of FIG. 4. The controller 120 then transmits the RNTP message including the generated band use restriction release information to the small cell base station 300.

In Step S203, the controller 120 releases the resource block allocated to the radio terminal 200 in Step S107 before the time corresponding to the transmission delay time elapses after the RNTP message including the band use restriction release information is transmitted.

(3) Advantageous Effect

In the radio communication system 1 of the embodiment, when the radio terminal 200 connected to the large cell base station 100 is receiving the interference of a predetermined value or larger from the small cell base station 300, the large cell base station 100 estimates the non-interfered PF evaluation value for determining whether allocating the resource block to the radio terminal 200 is appropriate assuming a case without the interference. Furthermore, when the non-interfered PF evaluation value is equal to or larger than the predetermined value, the large cell base station 100 transmits to the small cell base station 300, the band use restriction information instructing the use restriction of the frequency band corresponding to the resource block.

Therefore, when the interference from the small cell base station 300 to the radio terminal 200 is large, and improvement of the throughput in the radio terminal 200 can be expected assuming a case without the interference, the resource block can be allocated with a control performed so that the interference to the radio terminal 200 is avoided. Accordingly, the interference from the small cell base station 300 to the radio terminal 200 connected to the large cell base station 100 can be appropriately reduced without degrading the use efficiency of the resource block.

(4) Other Embodiment

The details of the present invention have been disclosed by using the embodiment of the present invention. However, it should not be understood that the description and drawings which constitute part of this disclosure limit the present invention. From this disclosure, various alternative embodiments, examples, and operation techniques will be easily found by those skilled in the art.

In the above-described embodiment, the large cell base station 100 uses the throughput in the radio terminal 200 as the communication quality for estimating the non-interfered PF evaluation value. Alternatively, the non-interfered PF evaluation value may be estimated using other communication qualities such as SINR.

In the above-described embodiment, the case is described in which the large cell base station 100 is a macrocell base station that forms a macrocell, and the small cell base station 300 is a femtocell base station that forms a femtocell. The present invention is not limited to the embodiment and it is sufficient if the small cell formed by the small cell base station 300 is smaller than the large cell formed by the large cell base station 100. For example, when the large cell base station 100 is the macrocell base station that forms the macrocell, the small cell base station 300 may be abase station that forms a microcell or a picocell. When the large cell base station 100 is the microcell base station that forms the microcell, the small cell base station 300 may be abase station that forms a picocell or a femtocell. When the large cell base station 100 is the picocell base station that forms the picocell, the small cell base station 300 may be a base station that forms the femto.

In the above-described embodiment, the radio communication system 1 has a configuration based on the LTE Release 9 or the LTE-Advanced. However, the radio communication system 1 may have a configuration based on other communication standards.

As described above, the present invention naturally includes various embodiments which are not described herein. Accordingly, the technical scope of the present invention should be determined only by the matters to define the invention in the scope of claims regarded as appropriate based on the description.

Note that the entire content of Japanese Patent Application No. 2009-249465 (filed on Oct. 29, 2009) is incorporated herein by reference.

INDUSTRIAL APPLICABILITY

The radio communication system, the large cell base station, and the communication control method of the present invention can appropriately reduce interference from the small cell base station to the radio terminal connected to the large cell base station while preventing the degradation of the use efficiency of the radio resource, and thus are useful as a radio communication system and the like.

The invention claimed is:

1. A large cell base station to which a radio terminal is connected, the large cell base station configured to form a large cell in which a small cell base station configured to form a small cell smaller than the large cell is installed, comprising:
   an evaluation value estimation unit configured to estimate an evaluation value for determining whether allocating a radio resource to the radio terminal is appropriate assuming that the radio terminal receives no interference from the small cell base station, wherein the evaluation value estimation unit calculates the evaluation value by dividing a fixed value which indicates a communication quality before the radio terminal receives the interference from the small cell base station or which is an average value of values indicating the communication quality within a first predetermined period by a variable that is an average value of values indicating the communication quality within a second predetermined period; and
   a band use restriction information transmitter configured to transmit, to the small cell base station, band use restriction information for instructing use restriction of a frequency band corresponding to the radio resource when the evaluation value estimated by the evaluation value estimation unit is a value indicating that allocating the radio resource is appropriate.

2. The large cell base station according to claim 1, wherein the radio resource corresponding to the frequency band under the use restriction corresponding to the band use restriction information is allocated to the radio terminal.

3. A large cell base station to which a radio terminal is connected, the large cell base station supporting an LTE and being configured to form a large cell in which a small cell base station configured to form a small cell smaller than the large cell is installed, comprising:
   an evaluation value estimation unit that calculates an evaluation value by dividing a fixed value which indicates a communication quality before the radio terminal receives the interference from the small cell base station or which is an average value of values indicating the communication quality within a first predetermined period by a variable that is an average value of values indicating the communication quality within a second predetermined period, and
   a band use restriction information transmitter configured to transmit, to the small cell base station, band use restriction information for instructing use restriction of a frequency band corresponding to a radio resource to be allocated to the radio terminal based on the evaluation value.

4. The large cell base station according to claim 3 further comprising: a band use restriction release information transmitter configured to transmit, to the small cell base station, band use restriction release information for instructing release of the use restriction of the frequency band corresponding to the radio resource to be allocated to the radio terminal.

5. A communication control method in a large cell base station to which a radio terminal is connected, the large cell base station configured to form a large cell in which a small cell base station configured to form a small cell smaller than the large cell is installed, comprising the steps of:
   estimating, at the large cell base station, an evaluation value for determining whether allocating a radio resource to the radio terminal is appropriate assuming that the radio terminal receives no interference from the small cell base station; wherein estimating the evaluation value includes dividing a fixed value which indicates a communication quality before the radio terminal receives the interference from the small cell base station or which is an average value of values indicating the communication quality within a first predetermined period by a variable that is an average value of values indicating the communication quality within a second predetermined period, and transmitting, from the large cell base station to the small cell base station, band use restriction information for instructing use restriction of a frequency band corresponding to the radio resource when the estimated evaluation value is a value indicating that allocating the radio resource is appropriate.

6. A communication control method in a large cell base station to which a radio terminal is connected, the large cell base station supporting an LTE and being configured to form a large cell in which a small cell base station configured to form a small cell smaller than the large cell is installed, comprising the step of:

estimating an evaluation value by dividing a fixed value which indicates a communication quality before the radio terminal receives the interference from the small cell base station or which is an average value of values indicating the communication quality within a first predetermined period by a variable that is an average value of values indicating the communication quality within a second predetermined period; and transmitting, from the large cell base station to the small cell base station, band use restriction information for instructing use restriction of a frequency band corresponding to a radio resource to be allocated to the radio terminal based on the evaluation value.

7. The communication control method according to claim 6, further comprising:

the step of transmitting, to the small cell base station, band use restriction release information for instructing release of the use restriction of the frequency band corresponding to the radio resource to be allocated to the radio terminal.

* * * * *